US006914897B1

(12) United States Patent
Schuster et al.

(10) Patent No.: US 6,914,897 B1
(45) Date of Patent: Jul. 5, 2005

(54) SYSTEM AND METHOD FOR ACCESSING RADIO PROGRAMS USING A DATA NETWORK TELEPHONE IN A NETWORK BASED TELECOMMUNICATION SYSTEM

(75) Inventors: Guido M. Schuster, Des Plaines, IL (US); Ikhlaq S. Sidhu, Vernon Hills, IL (US); Frederick D. Dean, Chicago, IL (US); Andrew Bezaitis, Chicago, IL (US)

(73) Assignee: 3 Com Corporation, Marlborough, MA (US)

(*) Notice: Subject to any disclaimer, the term of this patent is extended or adjusted under 35 U.S.C. 154(b) by 0 days.

(21) Appl. No.: 09/516,269

(22) Filed: Feb. 29, 2000

Related U.S. Application Data

(63) Continuation-in-part of application No. 09/406,322, filed on Sep. 27, 1999, and a continuation-in-part of application No. 09/406,128, filed on Sep. 27, 1999, now Pat. No. 6,577,622.

(51) Int. Cl.[7] .............................................. H04L 12/66
(52) U.S. Cl. ...................... 370/352; 370/338; 370/401; 370/465; 379/88.17; 379/265.09; 709/218
(58) Field of Search .............................. 370/310, 310.2, 370/351–356, 396, 400, 401, 338, 465–467, 492–495, 326; 455/3.01–3.06; 379/88.17, 265; 709/217–219

(56) References Cited

U.S. PATENT DOCUMENTS

| 4,973,837 A | 11/1990 | Bradbeer |
| 5,471,616 A | 11/1995 | Johnson et al. |

(Continued)

FOREIGN PATENT DOCUMENTS

| EP | 0 704 788 A2 | 4/1996 |
| EP | 0 881 848 A2 | 12/1998 |
| WO | WO 97/31492 | 8/1997 |
| WO | WO 97/33421 | 9/1997 |
| WO | WO 98/04065 | 1/1998 |
| WO | WO 98/16051 | 4/1998 |
| WO | WO 98/37665 | 8/1998 |
| WO | WO 99/12365 | 3/1999 |
| WO | WO 99/19988 | 4/1999 |

OTHER PUBLICATIONS

Terry, Douglas B. et al. *Managing Stored Voice In the Etherphone System*, Operating Systems Review (SIGOPS), US, ACM Head Quarter, New York, NY. vol. 21, No. % (Nov. 8, 1987), pps. 103–104, XP 000005196.

International Search Report for PCT Application Serial Number PCT/US00/26618, Dated Feb. 19, 2001.

(Continued)

*Primary Examiner*—Brian Nguyen
*Assistant Examiner*—Tri H. Phan
(74) *Attorney, Agent, or Firm*—McDonnell Boehnen Hulbert & Berghoff LLP

(57) ABSTRACT

A system and method of accessing radio programming from radio stations that communicate radio programming on a data network. The radio programming is accessed as radio or audio signals formatted in radio-over-data packets to a data network telephone. The data network telephone is a telephone that uses voice-over-data communications channels over a data network to make telephone connections with other data network telephones. The data network telephone includes a display, a keypad, a handset and an optional speaker output. The data network telephone advantageously permits simultaneous access to radio programming and communication on a telephone connection. The data network telephone also includes an interface to a portable information device. A radio control application may be used on the portable information device that communicates control information to a radio application on the data network telephone. The PID may be used to set the desired radio station, volume and other settings that may be communicated to the radio application on the data network telephone.

6 Claims, 9 Drawing Sheets

U.S. PATENT DOCUMENTS

| | | | |
|---|---|---|---|
| 5,646,945 A | 7/1997 | Bergler | |
| 5,742,905 A | 4/1998 | Pepe et al. | 455/461 |
| 5,838,665 A | 11/1998 | Kahn et al. | 370/260 |
| 5,894,595 A | 4/1999 | Foladare et al. | 455/414 |
| 5,970,059 A | 10/1999 | Ahopelto et al. | |
| 6,084,584 A | 7/2000 | Nahi et al. | |
| 6,141,341 A | 10/2000 | Jones et al. | |
| 6,167,040 A | 12/2000 | Haeggstrom | |
| 6,188,688 B1 | 2/2001 | Buskirk, Jr. | |
| 6,212,261 B1 | 4/2001 | Meubus et al. | |
| 6,266,539 B1 | 7/2001 | Pardo | |
| 6,334,126 B1 | 12/2001 | Nagatomo et al. | |
| 6,337,858 B1 | 1/2002 | Petty et al. | |
| 6,359,892 B1 | 3/2002 | Szlam et al. | |
| 6,385,308 B1 | 5/2002 | Cohen et al. | |
| 6,400,804 B1 | 6/2002 | Bilder | |
| 6,404,764 B1 | 6/2002 | Jones et al. | |
| 6,414,962 B1 | 7/2002 | Hall et al. | |
| 6,418,198 B2 | 7/2002 | Brablec et al. | |
| 6,421,235 B2 | 7/2002 | Ditzik | |
| 6,445,697 B1 | 9/2002 | Fenton | |
| 6,448,978 B1 | 9/2002 | Salvador et al. | |
| 6,456,594 B1 | 9/2002 | Kaplan et al. | |
| 6,456,601 B1 | 9/2002 | Kozdon et al. | |
| 6,477,565 B1 | 11/2002 | Daswani et al. | |
| 6,477,576 B2 | 11/2002 | Angwin et al. | |
| 6,483,902 B1 | 11/2002 | Stewart et al. | |
| 6,493,338 B1 | 12/2002 | Preston et al. | |
| 6,496,477 B1 | 12/2002 | Perkins et al. | |
| 6,526,462 B1 | 2/2003 | Elabd | |
| 6,539,359 B1 | 3/2003 | Ladd et al. | |
| 2001/0022784 A1 | 9/2001 | Menon et al. | |
| 2001/0030950 A1 | 10/2001 | Chen et al. | |

OTHER PUBLICATIONS

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON–BrainPad*, Proceedings $13^{th}$ Tron Project International Symposium, Online!, (Dec. 4–7, 1996), pps. 95–103.

Gessler, Stefan et al., *PDAs as Mobile WWW Browsers*, Computer Networks and ISDN Systems, vol. 28, No. 1 (Dec. 1995), pps. 53–59.

International Search Report for PCT Application Serial No. PCT/US00/26650, Dated Feb. 19, 2001.

International Search Report for PCT Application Serial No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151–157.

International Search Report for PCT Application Serial Number PCT/US00/26649, Dated Feb. 6, 2001.

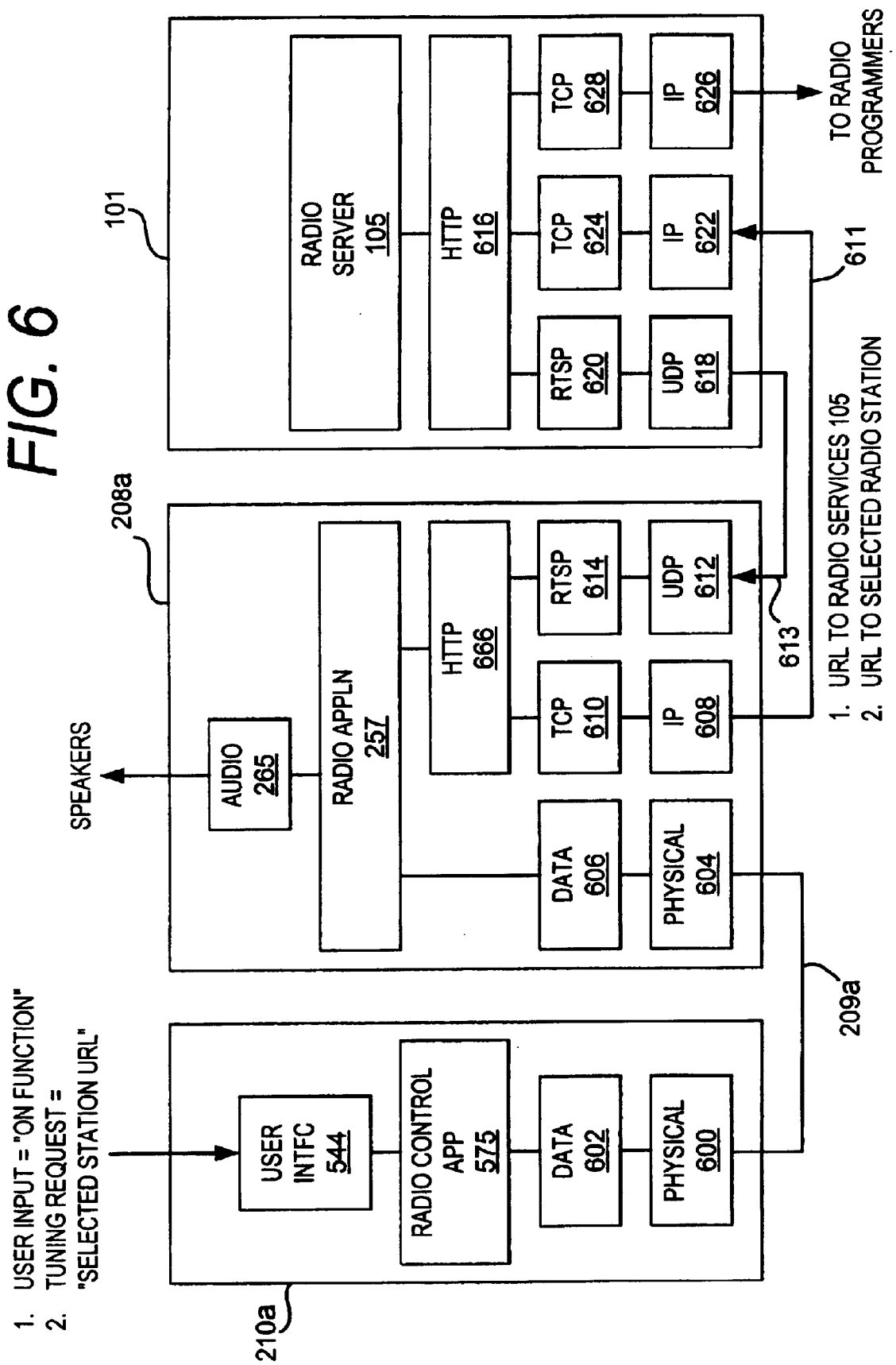

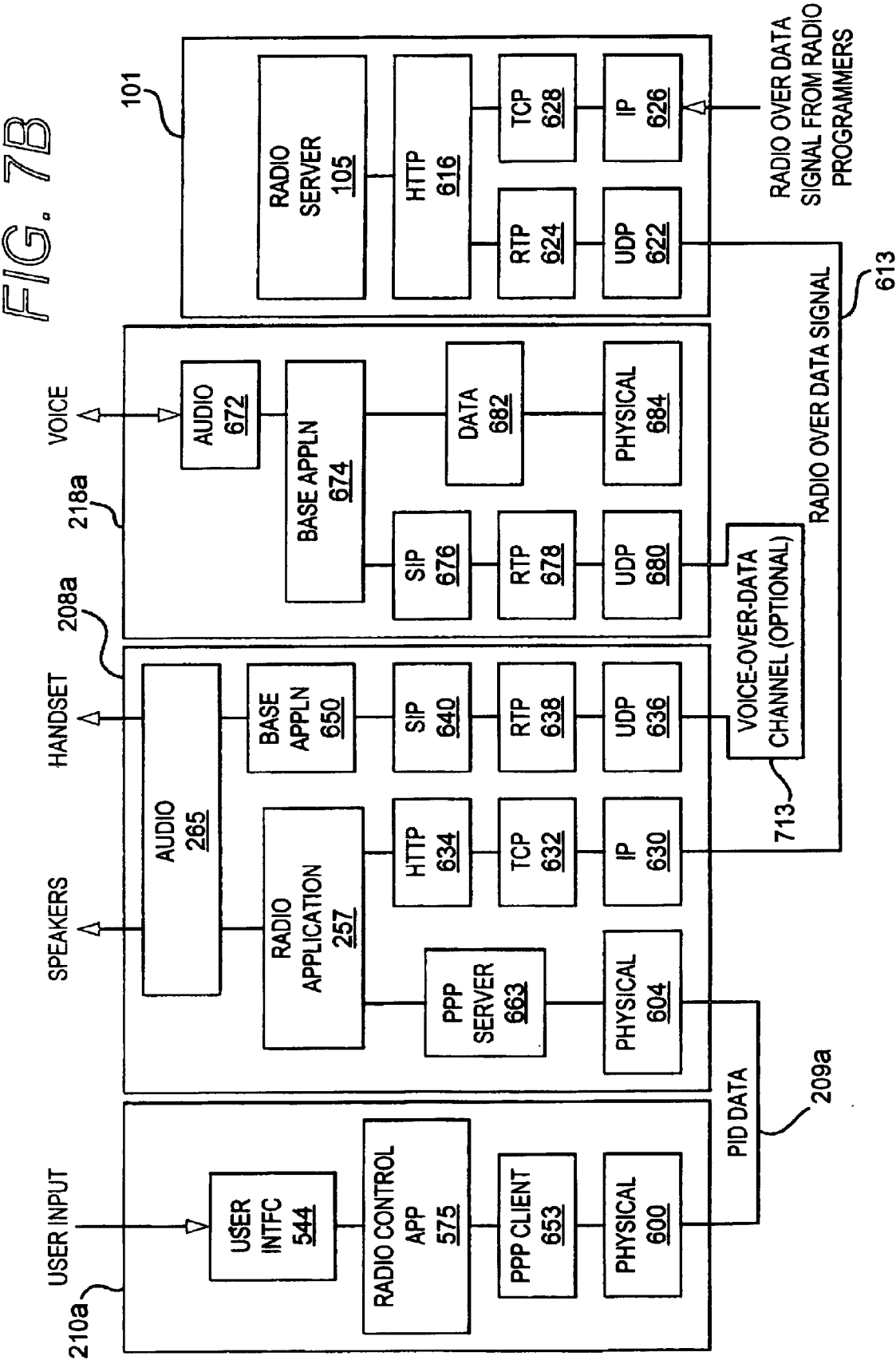

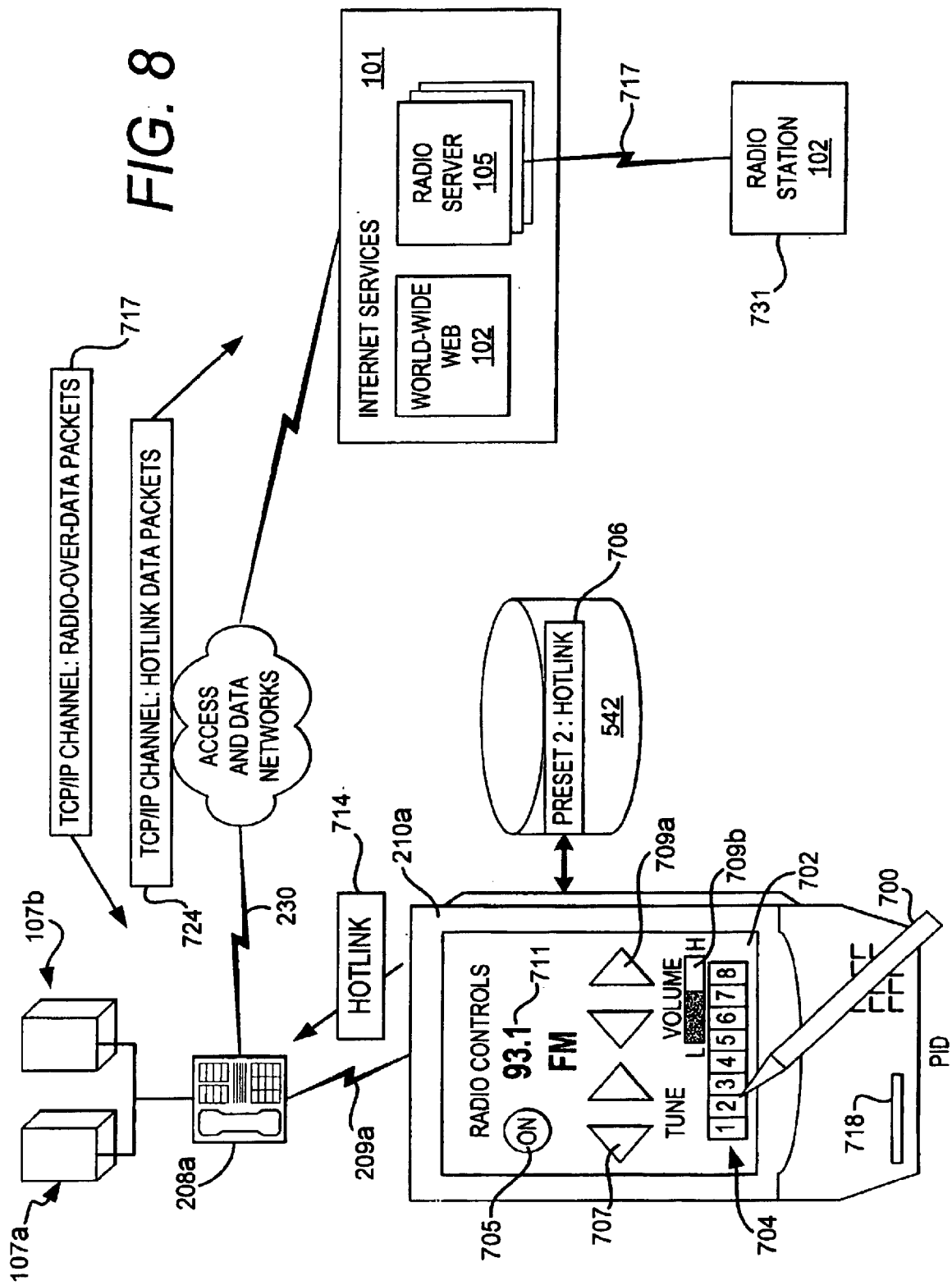

SYSTEM AND METHOD FOR ACCESSING RADIO PROGRAMS USING A DATA NETWORK TELEPHONE IN A NETWORK BASED TELECOMMUNICATION SYSTEM

RELATED APPLICATIONS

This application is a Continuation-In-Part of U.S. patent application Ser. No. 09/406,322, filed Sep. 27, 1999 by Guido M. Schuster, lkhlaq S. Sidhu, Frederick Dean, and Ronnen Belkind and titled "SYSTEM AND METHOD FOR ACCESSING A NETWORK SERVER USING A PORTABLE INFORMATION DEVICES THROUGH A NETWORK BASED TELECOMMUNICATION SYSTEM," assigned to 3Com Corporation; and this application is also a Continuation-In-Part of U.S. patent application Ser. No. 09/406,128, filed Sep. 27, 1999 by Guido M. Schuster, Sagan S. Sidhu, Ikhlaq S. Sidhu, and Ronnen Belkind and titled "SYSTEM AND METHOD FOR USING A PORTABLE INFORMATION DEVICE TO ESTABLISH A CONFERENCE CALL ON A TELEPHONY NETWORK" and assigned to 3Com Corporation, now U.S. Pat. No. 6,577,622.

FIELD OF THE INVENTION

The present invention relates to a system and method for providing communication services over a network. In particular, the present invention relates to a system and method for providing communication between a portable information devices (PIDs) and a network server through a network connected telecommunication device.

DESCRIPTION OF THE RELATED ART

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more well-known CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or deactivate a CLASS feature using "*" directives (e.g., *69 to automatically return a call to the most recent caller). CLASS features may also be implemented with the use of out-of-band data. CLASS feature data is typically transmitted between local Class-5 switches using the Signaling System 7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call.

After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that enables users to connect to services available on a data network using a personal information device. An example of such services is the radio programs that radio stations may broadcast over a data network. Such radio stations are broadcast digitally encoded audio signals using a transport protocol. For example, digitally encoded audio signals may be transported over the Internet using the Real-time Transport Protocol (RTP). In accordance with embodiments of the present invention, a telephone that communicates over a data network may function as a radio receiver. In addition, a personal information device may be used to control the data network telephone as it functions as a radio receiver.

SUMMARY OF THE INVENTION

In view of the above, a system is provided for accessing radio programming in a data network telephony system. The system includes a data network to provide data connectivity for a plurality of data communications channels using data transport protocols. A radio server is connected to the data network. The radio server communicates an audio signal as radio-over-data packets on a radio-over-data channel. A data network telephone is connected to the data network. The data network telephone communicates a voice signal as voice-over-data packets on a voice-over-data channel. The data network telephone converts voice-over-data packets communicated on the voice-over-data channel to voice signals. The data network telephone communicates with the radio server via the radio-over-data channel. The data network telephone includes an audio output. A radio application in the data network telephone receives the audio signals in the radio-over-data channel and couples the audio signals to the audio output.

In another aspect of the present invention, a data network telephone is provided to access radio programming on a data network. The data network telephone has a user interface circuit with a keypad, a graphical user interface display, an audio input and an audio output. A data network interface connects the data network telephone to a data network to provide data connectivity on at least one data communications channel. The data network interface communicates audio signals as audio-over-data packets using a radio-over-data channel connected to a radio server. The radio server accesses the audio signals from a radio station that communicates radio programming over the data network. A signaling stack is included to initiate a telephone connection on a voice-over-data channel. The voice-over-data channel uses the data network interface to communicate voice signals as voice-over-data packets. A voice-over-data application processes a voice signal in the voice-over-data packets received over the voice-over-data channel and couples the voice signal to the audio output. The voice-over-data application converts an input voice signal received from the audio input to voice-over-data packets to communicate on the voice-over-data-channel. A radio application processes the audio signal in the audio-over-data packets and couples the audio signals to the audio output.

In a further aspect of the present invention, a method is provided in a data network telephony system having a voice communications device connected to a data network for accessing radio programming from a radio station on the data network. In accordance with the method, a voice communication channel is provided between the first voice communications device and a second voice communication device coupled to the data network. A user selects a radio station using a station selector. A radio station request channel is provided between the first voice communications device and a radio server coupled to the data network. A data network identifier corresponding to the radio station is sent on the radio station request channel. The radio server connects to the radio station using the data network identifier and establishes a radio-over-data channel between the radio station and the first voice communications device. A radio-over-data signal having audio signals is sent in radio-over-data packets from the selected radio station to the first voice communication device using the radio-over-data channel. The audio signals from radio-over-data packets are coupled to an audio output on the first voice communications device.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 6 is a block and stack-layer diagram illustrating an embodiment of the protocol stacks in an exemplary embodiment of a PID linked to a data network telephone;

FIG. 7B is a block and stack layer diagram illustrating an alternative embodiment of the present invention in which a connection to an Internet service may be established; and FIG. 8 is a combined block and pictorial diagram showing advantageous use of a system for using a PID to control a data network telephone operating as a radio according to one embodiment of the present invention.

DETAILED DESCRIPTION OF THE PREFERRED EMBODIMENT

Figure 1:
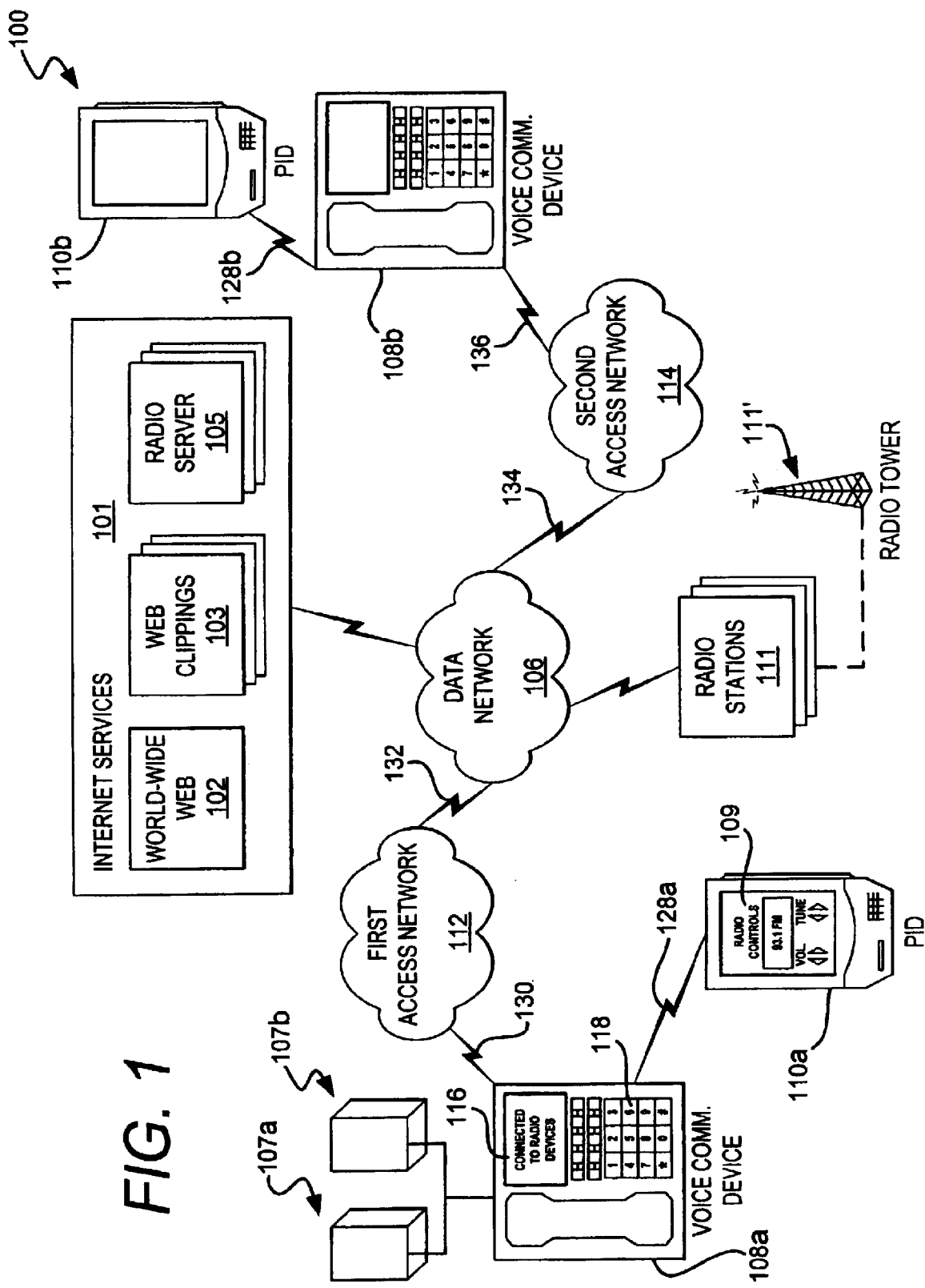
FIG. 1 is block diagram of a network telephony system according to one embodiment of the present invention.

The following patent applications owned by the assignee of the present application are incorporated be reference:

U.S. patent application Ser. No. 09/406,321 "System and Method for Controlling Telephone Service Using a Wireless Personal Information Device" to Schuster, et al., Attorney Docket No. 99,365;

U.S. patent application Ser. No. 09/406,320 "System and Method for Advertising Using Data Network Telephone Connections" to Schuster et al., Attorney Docket No. 99,373;

U.S. patent application Ser. No. 09/405,283 "System and Method for Providing User-Configured Telephone Service in a Data Network Telephony System" to Sidhu, et al., Attorney Docket No. 99,411;

U.S. patent application Ser. No. 09/406,322 "System and Method for Accessing a Network Server Using a Portable Information Device Through a Network Based Telecommunication System" to Schuster, et al., Attorney Docket No. 99,593;

U.S. patent application Ser. No. 09/406,152 "System and Method for Interconnecting Portable Information Devices Through a Network Based Telecommunication System" to Schuster, et al., Attorney Docket No. 99,594;

U.S. patent application Ser. No. 09/405,981 "System and Method for Enabling Encryption on a Telephony Network" to Schuster, et al., Attorney Docket No. 99,595;

U.S. patent application Ser. No. 09/406,128 "System and Method for Using a Portable Information Device to Establish a Conference Call on a Telephony Network" to Schuster, et al., Attorney Docket No. 99,596;

U.S. patent application Ser. No. 09/406,151 "System and Method for Associating Notes with a Portable Information Device on a Network Telephony Call" to Schuster, et al., Attorney Docket No. 99,600;

U.S. patent application Ser. No. 09/406,298 "System and Method for Providing Shared Workspace Services Over a Telephony Network" to Schuster, et al., Attorney Docket No. 99,601;

U.S. patent application Ser. No. 09/406,066 "System and Method for Providing Service Provider Configurations for Telephones in a Data Network Telephony System" to Schuster, et al., Attorney Docket No. 99,602;

U.S. patent application Ser. No. 09/451,388 "System and Method for Providing User Mobility Services on a Telephony Network" to Schuster, et al., Attorney Docket No. 99,229;

U.S. patent application Ser. No. 09/470,879 "System and Method for Providing Call-Handling Services on a Telephony Network" to Schuster, et al., Attorney Docket No. 99,914;

U.S. patent application Ser. No. 09/181,431 "Method Apparatus and Communication System for Companion Information and Network Appliances" to Wang, et al.;

U.S. patent application Ser. No. 09/321,941 "Multiple ISP Support for Data Over Cable Networks" to Ali Akgun, et al., Attorney Docket No. 98,638;

U.S. patent application Ser. No. 09/218,793 "Method and System for Provisioning Network Addresses in a Data-Over-Cable System" to Ali Akgun, et al., Attorney Docket No. 99,678; and U.S. patent application Ser. No. 08/887,313 "Network Access Methods, Including Direct Wireless to Internet Access" to Yingchun Xu, et al., Attorney Docket No. 97,181.

The following patent applications owned by the assignee of the present application and filed on Feb. 29, 2000, are incorporated by reference:

"System And Method For Providing Telephone Service Having Private Branch Exchange Features In A Data Network Telephony System" to Schuster et al., Attorney Docket No. 99,366, application Ser. No. 09/515,365.

"System And Method For Providing A Wireless Data Network Telephone System" to Schuster et al., Attorney Docket No. 99,590, application Ser. No. 09/515,798.

"System And Method For Accessing A Network Server Using A Portable Information Devices Through A Network Based Telecommunication System" to Schuster et al., Attorney Docket No. 99,592, application Ser. No. 09/515,969.

"System And Method For Providing Local Information In A Data Network Telephony System" to Schuster et al., Attorney Docket No. 99,838, application Ser. No. 09/515,366.

"System And Method For Enabling A Portable Information Device For Use In A Data Network Telephone System" to Schuster et al., Attorney Docket No. 99,741, application Ser. No. 09/515,795.

"Dialing Token For Initiating A Telephone Connection In A Data Network Telephone System" to Schuster et al., Attorney Docket No. 99,375, application Ser. No. 09/515,364.

"Flexible Dial Plan for a Data Network Telephony System" to Schuster, et al., Attorney Docket No. 99,374, application Ser. No. 09/515,797.

"Personalized Call Announcement on a Data Network Telephony System" to Schuster, et al., Attorney Docket No. 99,597, application Ser. No. 09/515,387.

"Personalizing a Data Network Appliance on a Data Network Telephony System" to Schuster, et al., Attorney Docket No. 99,598, application Ser. No. 09/515,970.

"Proximity-Based Registration on a Data Network Telephony System" to Schuster, et al., Attorney Docket No. 99,599, application Ser. No. 09/515,796.

The following additional references are also incorporated by reference herein:

"Multiple ISP Support for Data Over Cable Networks" to Ali Akgun, et al. U.S. patent application Ser. No. 09/218,793

"Method and System for Provisioning Network Addresses in a Data-Over-Cable System" to Ali Akgun, et al., Attorney Docket No. 98,678

A. PID-Enabled Data Network Telephony System

FIG. 1 is a block diagram showing an exemplary embodiment of a system 100 for connecting to Internet services according to one embodiment of the present invention. A first voice communication device 108a may communicate over a data network 106 by connecting via a first access network 112 using a connection 130. A second voice communication device 108b is linked to a second access network 114 through connection 136 and may communicate over the data network 106 by connecting via the second access network 114.

The data network 106 in the system 100 may include one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf org. In addition, an Internet Telephony gateway may be included within the system 100 to allow for voice connections to users connected by subscriber lines at a PSTN Central Office.

The data network 106 may be used to access a variety of Internet services 101. For example, the Internet includes the World-Wide Web 102, which is a well-known system for exchanging data over the Internet. The World-Wide Web 102 is commonly used to access targeted information using a computer workstation and an application on the workstation called a browser. With respect to PID's, many Internet Content Providers offer a variety of Web clippings 103, which are World-Wide Web data formatted for viewing on a PID, which is smaller than the display on a workstation. In one embodiment of the present invention, the Wireless Applications Protocol (WAP) is used to access such Web data. For more information on WAP, reference is made to the WAPForum.org offerings on the Internet. The Web clippings service offered by Palm.net from Palm™ Computing may also be used. One advantage of the system 100 in FIG. 1 is that web clippings 103 and other Internet services 101 may be accessed using the PID 110a,b without having to place a telephone call over the wireless cellular network.

Another example of the services offered by many Internet Content Providers is radio programming services that may be accessed over the Internet. Radio programmers in radio stations 111 in locations all ovedr the world may broadcast radio programs over the Internet in addition to a radio transmitter 111' to expand their listening audience beyond the reach of the airwaves. In addition, radio programmers may also include data services that operate servers, herein termed "radio stations", that communicate audio signals (e.g. from music, talk shows, etc.) on data channels using the data network 106 without actually broadcasting any radio airwaves. In the present context, the radio stations 111 include any data service provider that communicates audio signals on data channels to permit the voice communications device 108a to output the audio signals on speakers 107a,b, or other audio output device.

The Internet content provider 101 may include a radio server 105 that may access radio program offerings from such radio stations 111. The radio server 105 may operate with a radio application operating on the voice communication devices 108a to provide the user with options and connections to selected radio stations 111. The radio programming services 105 broadcast digitally encoded audio signals using one or more data transport protocol, such as the Real-time Transport Protocol (RTP) and the User Datagram Protocol (UDP), or Real-Time Streaming Protocol (RTSP) with the Transport Control Protocol (TCP) or UDP.

Users may access the radio programs using radio applications, which execute on a personal computer to permit the selection and reception of the radio programs on the Internet. Example of such radio applications include Real Player™, Earthlink™, and the Media Player™ from Microsoft™. The radio applications may be used to connect to the radio server 105 to receive a list, a menu or a display of radio program offerings by the various radio stations 111 that the radio server 105 can access. The radio applications may also be used to make a selection from the offerings of radio stations 111. The selection is communicated to the radio server 105, which connects to the selected radio station 111 and ensures that the radio station 111 communicates with the user's radio application.

In the present context, the radio server 105 may include any data network communications device that facilitates access to radio programming by providing data channels to clients (e.g. radio applications) that communicate audio signals for output on an audio device (e.g. speakers 107a,b). The source of the audio signals may be anywhere including the radio server 105, a service on the Internet content provider 101, a radio station 111 that already broadcasts over airwaves, a radio station 111 that only communicates on the data network 106, etc. The radio server 105, in accordance with embodiments of the present invention, provides the user with the access to these audio signal sources. In one example, the radio server 105 provides one or more radio stations with the direct interface to the data network 106. In another example, the radio server 105 searches for available radio programming throughout the data network 106 and provides the user with the ability to chose from among available selections and with the ability to facilitate the connection with the user's selected station. It is to be understood by one of ordinary skill in the art that while the radio server 105 is shown as an offering of the Internet content provider 101 in accordance with a preferred embodiment, the radio server 105 may be implemented as a data service offered anywhere on the data network 106.

The voice communication devices 108a–b (described further below with reference to FIG. 3) typically include a voice input, a voice output and a voice processing system. The voice processing system converts voice sound to digital data signals that are communicated on a voice connection over the data network. The voice processing system also converts digital data signals received from the voice connection to voice sound. The voice communication devices 108a–b typically include a central processing unit and memory to store and process computer programs. Additionally, each voice communication device 108a–b typically includes a unique network address, such as an IP address, in memory to uniquely identify it to the data network 106 and to permit data packets to be routed to the device.

A first PID 110a linked to the first voice communication device 108a via connection 128a may communicate over the data network 106 by connecting via the first access network 112. A second PID 110b linked to the second voice communication device 108b via connection 128b may communicate over the data network 106 by connecting via the second access network 114. The PIDs 110a–b each contain user attributes stored in a user information data base. The user attributes may contain such information as a user identifier, schedule information, and other information that is associated with a user of the PID 110a or 110b. The PIDS 110a–b each include a user interface allowing a user to easily enter and retrieve data. In a preferred embodiment, the user interface includes a pressure-sensitive display that allows a user to enter input with a stylus or other device. An example of a PID with such an interace is a PDA (Personal Digital Assistant), such as one of the Palm™ series of PDAs offered by 3Com® Corporation. The PIDs 110a–b may include other functionality, such as wireless phone or two-way radio functionality.

Links 128a–b are point-to-point links, and may be entirely or partially wireless, or they may be bard-wired connections. Each of the links 128a–b is preferably a wireless link, such as an infrared link specified by the Infrared Data Association (IrDA) (see irda.org for further information) or a radio frequency (RF) link such as the Bluetooth system (see www.bluetooth.com for further information), or the IEEE 802.11 Specification. However, the point-to-point link can also be a hardwired connection, such as an RS-232 serial port.

In one embodiment, the voice communication device 108a includes a handset with a receiver and transmitter similar or identical to handsets of traditional circuit-switched telephones. A console on which the handset sits may include the voice processing system, a display 116, and a keypad 118. The voice communications device 108a may also have speaker phone functions that permit voice signals to be audible using a speaker or speakers in addition to, or instead of the handset.

In a preferred embodiment, a portion of the voice communication device 108a utilizes an NBX 100™ communication system phone offered by 3Com® Corporation. In alternative embodiments, the voice communication device 108a may include any device having voice communications capabilities. For example, a personal computer having a microphone input and speaker output may also be used to implement the voice communication device 108a. Other configurations are also intended to be within the scope of the present invention.

The voice communication devices 108a and 108b may communicate on the data network 106 using alternative data and telecommunications configurations depending on the nature of the access networks 112, 114 connecting the voice communication devices 108a and 108b to each other and/or to other network entities. The access networks 112, 114 typically include any high bandwidth network adapted for data communications, i.e. a network having greater than 64,000 bits-per-second (bps) bandwidth. The access networks 112, 114 may link to the voice communication devices 108a–b using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112, 114 may also include the PSTN and link the voice communications devices 108a–b by an analog modem.

One advantage of the PID-Enabled Data Network Telephony System 100 in FIG. 1 is that it may be used to provide PID connectivity to the data network 106. In one embodiment, the PIDs 110a,b are able to connect to data network services through a user interface on the PID 110a. For example, the PID 110a may include a web application for retrieving information that can be communicated from the Internet services 101 over the data network 106, transported across the first access network 112, to the voice communication device 108a. The PID 110a can receive the information across the link 128a for display on the PID 110ba.

The voice communication device 108a may also access one or more radio servers 105 that may be offered by the Internet services provider 101. One or more speakers 107a,b may be connected to an audio output on the voice communication device 108a and used to output the audio portion of the radio programs. The PID 110a may include a radio tuner application that allows a user to remotely select radio programs. The radio tuner application may include a radio turner display 109 to show the radio program that is selected as well as the controls for adjusting volume and for selecting other programs.

In one embodiment, the PID 110a uses the Point-to-Point Protocol (PPP) to communicate with the voice communications device 108a. The PID 110a communicates requests for services to the voice communications device 108a to send over the data network 106. The PID 110a receives the Internet service offerings (e.g. web clippings and information regarding the radio servers) from the data network through the voice communication device 108a.

A voice-over-data channel for communicating voice-over-data may or may not concurrently exist with this communication of information over a data channel. In this way, a user of the PID 110a can receive information from the Internet services 101 while voice signals are communicated between the voice communication device 108a and the voice communication device 108b. Alternatively, the user may use the PID 110a connection to the Internet services independently of any telephone calls.

Figure 2:
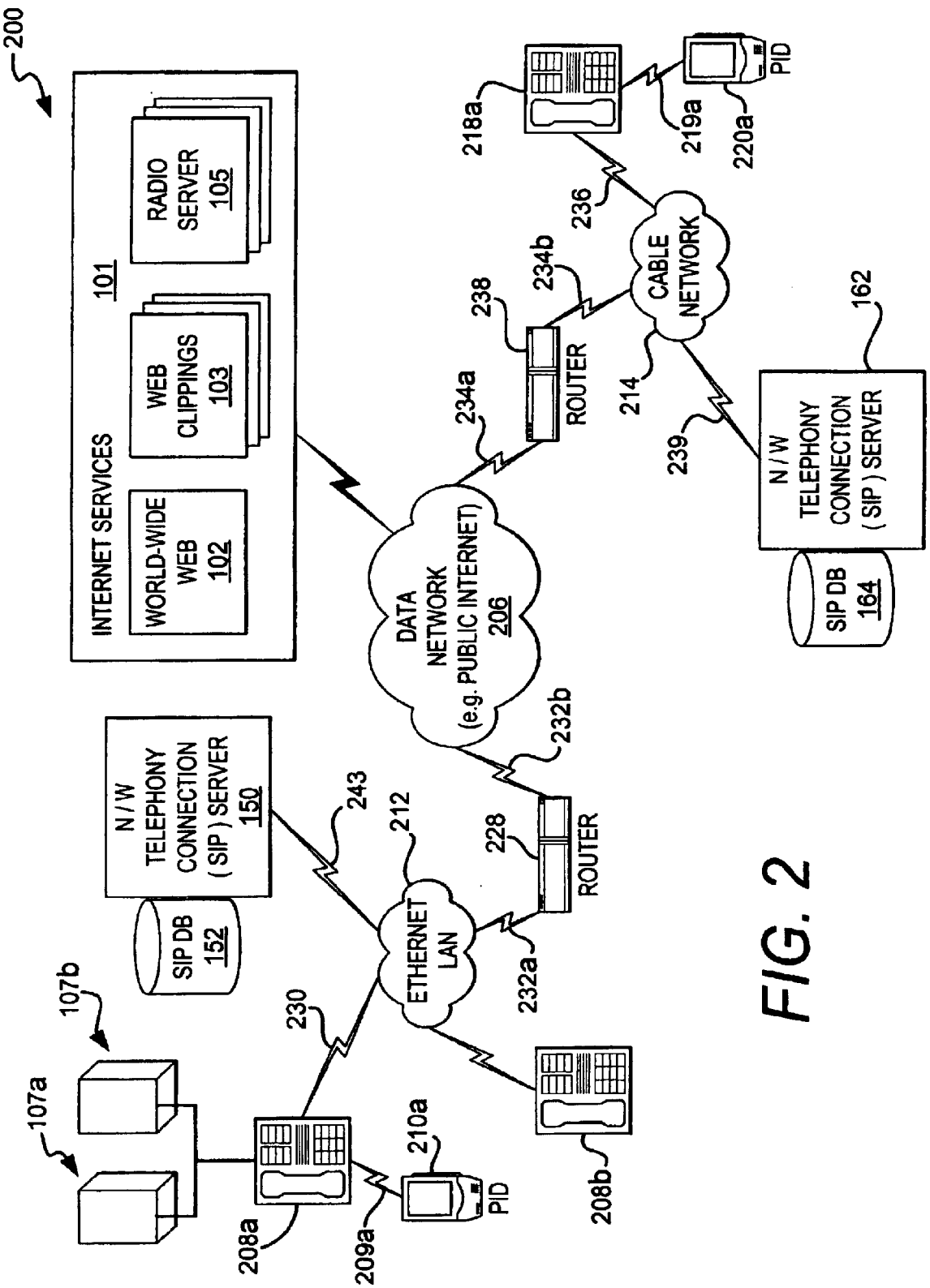
FIG. 2 is a block diagram showing a system for using a portable information device (PID) to connect to radio programming services on a telephony system according to an exemplary embodiment of the present invention.

B. System for Connecting to Data Network Services Using a Data Network Telephony System The system 100 in FIG. 1 is preferably a data communications system in which traditional telephony functions are carried out by communicating voice signals between voice communications devices 108a,b as digital data signals. FIG. 2 is a block diagram showing one example of the system 100 of FIG. 1 for accessing Internet services 101 using a PID 210a according to the present invention. The system 200 in FIG. 2 includes a local area network 212, connected to a data network 206 by a first router 228. A cable network 214 is connected to the data network 206 by a second router 238. Those of ordinary skill in the art will appreciate that while FIG. 2 illustrates the access networks as the local area network 212 and the cable network 214, any other type of network may be used. For example, the local area network 212 and/or the cable network 214 may be replaced by ISDN, DSL, or any other high-speed data link.

1. Local Area Network As An Exemplary Access Network

The local area network 212 provides data connectivity to its network elements, such as a first data network telephone 208a, a second data network telephone 208b, and a first network telephony connection server 150. The local area network 212 in FIG. 2 is an Ethernet LAN operating according to the IEEE 802.3 specification, which is incorporated by reference herein, however, any other type of local area network may be used. The local area network 212 uses the router 228 to provide the data network telephone 208a and the first network telephony connection server 150 with access to the data network 206. For example, the router 228 may perform routing functions using protocol stacks that include the Internet Protocol and other protocols for communicating on the Internet.

The first network telephony connection server 150 provides telephony registration, location and session initiation services for voice connections in which its members are a party. A user may register for telephony service with an administrator of the first network telephony connection server 150 and receive a user identifier and a telephone identifier. The user identifier and telephone identifier may be sequences of unique alphanumeric elements that callers use to direct voice connections to the user. The first network telephony connection server 150 registers users by storing user records in a first registration database 152 in response to registration requests made by the user.

The call setup process and the user and telephone identifiers preferably conform to requirements defined in a call management protocol. The call management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein, however, any other such protocol may be used. Other protocols include H.323, the Media Gateway Control Protocol (MGCP), MEGACO, etc.

The network telephony connection server 150 may be used to provide telephony service for mobile users. A user may be registered to use the first network telephone 208a (which is identified by its telephone identifier), but move to a location near the second network telephone 208b. The user may re-register as the user of the second network telephone 208b. Calls that identify the user by the user's user identifier may reach the user at the second network telephone 208b.

2. Cable Network As An Exemplary Access Network

The system 200 in FIG. 2 also shows a cable network 214 connected to the data network 206 by a router 238. The cable network 214 provides data network access to its network elements, which in FIG. 2 include a third data network telephone 218a and a second network telephony connection server 162. The users of the data network telephone 218a connected to the cable network 214 may communicate over the data network 206 with the users of the data network telephones 208a–b connected to the local area network 212.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

3. Providing Telephony Services

The second network telephony connection server 162 is preferably a SIP-based server that performs call initiation, maintenance and teardown for the data network telephone 218a connected to the cable network 214. The second network telephony connection server 162 may be similar or identical to the first network telephony connection server 150 connected to the local area network 212.

The system 200 shown in FIG. 2 permits the data network telephones 208a–b connected to the local area network 212 to communicate with the data network telephone 218a connected to the cable network 214. The system shown in FIG. 2 uses SIP in order to establish, maintain, and teardown telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection server 150 and 162. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several data network telephones at once until somebody takes the call. Registrar servers are used to record the SIP address (the SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the first network telephony server 150, is the primary destination of all SIP messages trying to establish a connection with users on the local area network 212.

Preferably, the first network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the first SIP database 152. It allows all mobile clients to register with their current locations.

Similarly, the second network telephony server 162 is the primary destination of all SIP messages trying to establish a connection with the data network telephone 218a connected to the cable network 214. Preferably, the second network telephony server 162 is also the only destination advertised to the SIP clients outside the cable network 214 on behalf of all the SIP clients (e.g. data network telephones) residing on the cable network 214. The second network telephony server 162 relays all SIP INVITE messages to the appropriate final destination (or another SIP proxy), based on a database lookup using the second SIP database 164.

The data network telephones 208a–b and 218a in the system 200 preferably have pre-programmed device identifiers (e.g. phone numbers), represented as SIP-URL's that are of the form sip: user@domain. An example is sip: 8475551212@3Com.com. After power-up, each of the data network telephones 208a–b and 218a sends a SIP REGISTER message to the default registrar, such as the network telephony servers 150 and 162. When a call arrives at one of the network telephony servers 150 or 162 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephone 208a–b or 218a is running the DHCP (Dynamic Host Configuration Protocol) so that when the location is changed, the IP address is also automatically changed.

An advantage of the system in FIG. 2 is that once the call is established between data network telephones, the data network 206 provides data connectivity for a plurality of data communications channels. For example, the data network telephones 208a and 218a can communicate voice signals as voice-over-data packets on a voice-over-data channel. The data network telephones 208a and 218a can also communicate data (such as PID data) as data packets on a data channel. For example, the data may be communicated to and from the PIDs 210a and/or 220a across links 209a and 219a to the data network telephones 208a and 218a, where data is packetized and depacketized as part of the process for communicating the data packets across the data network 206 and any access networks, such as the Ethernet LAN 212 and the cable network 214. The data channels may be established to communicate data to and from the Internet services 101.

4. The Data Network Telephones

The data network telephones 208a–b are preferably telephones that include an Ethernet communications interface for connection to an Ethernet port. The Ethernet phones in FIG. 2 support the Internet Protocol (IP), using an IP address that is either statically configured or obtained by access to a Dynamic Host Configuration Protocol (DHCP) server.

Figure 3:
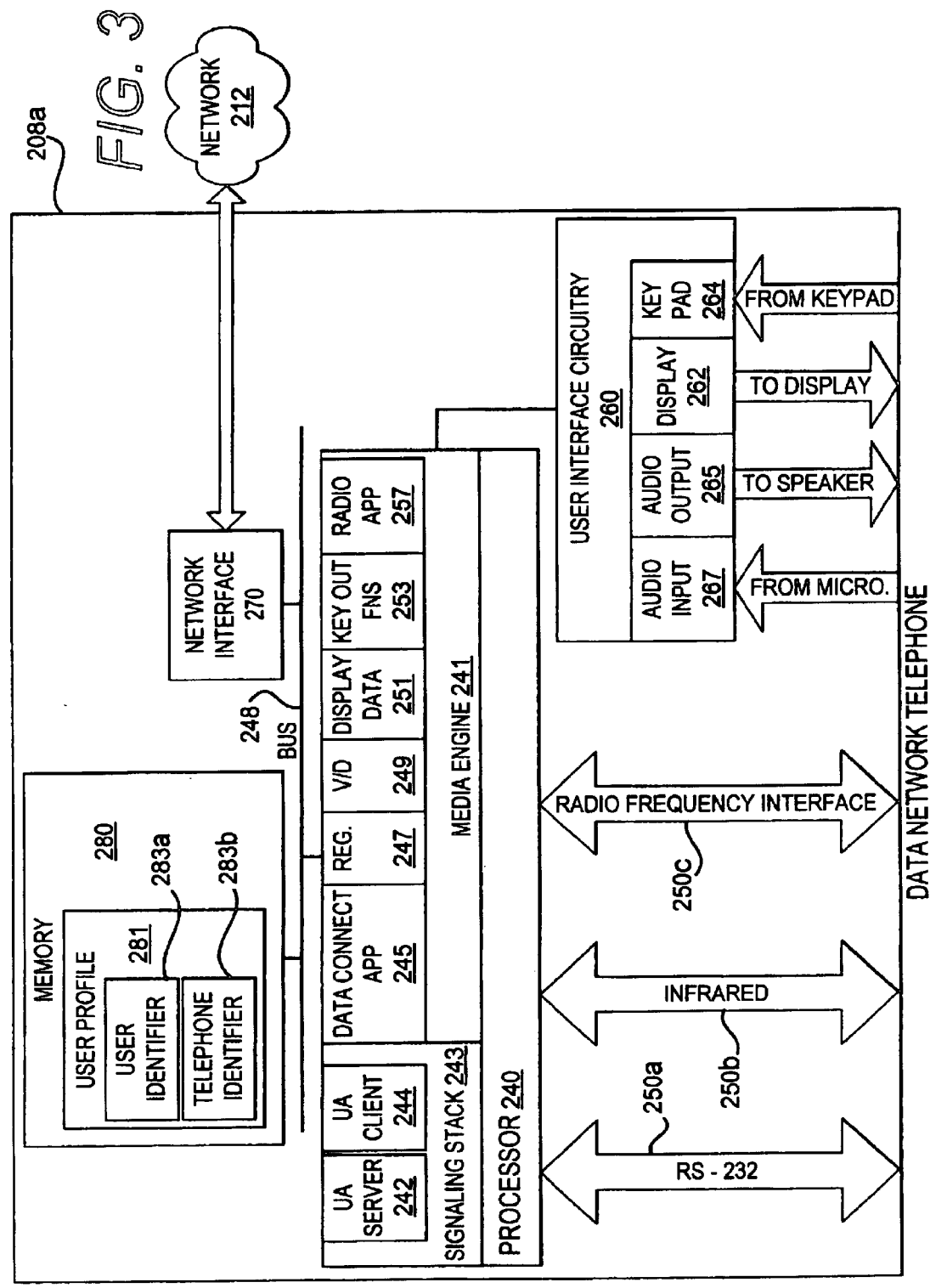
FIG. 3 is a block diagram of a data network telephone according to an embodiment of the present invention.

FIG. 3 is a block diagram showing the data network telephone 208a connected to the local area network 212 in FIG. 2. The data network telephone 208a in FIG. 3 is connected to the network 212 by a network interface 270.

The network interface 270 may, for example, be a network interface card that plugs into a card-holding structure that is wired as a bus 248. The bus 248 is any data connectivity system that connects the network interface 270 with a processor 240 and a memory 280. Also connected to the processor are user interface circuitry 260 and three exemplary and alternative link interfaces 250a–c to a PID, such as the PID 210a.

A first link interface includes an RS-232 serial connection 250a and associated coupling hardware and mechanisms. The first alternative link interface 250a may, for example, be a docking cradle for a PDA (Personal Digital Assistant) such as that used with the well-known Palm™ hand-held computing device. The docking cradle uses RS-232 to transfer data between the PDA and the data network telephone 208a.

The second alternative link interface includes an infrared connection 250b. The infrared connection may comprise infrared circuitry 250b for converting signals into infrared output and for accepting infrared input that connects to the processor 240 via an intermediary RS-232 connection. A hardware infrared interface is used by the infrared circuitry to transmit and receive the infrared signals. One of ordinary skill in the art will appreciate that any suitable infrared connection 250b scheme may be used. For example, an alternative infrared connection 250b may connect directly to the processor 240 and use any suitable physical and data link scheme to format the digital signals.

The third alternative link interface includes a radio connection 250c. The radio connection 250c may comprise radio-frequency circuitry for converting signals into radio frequency output and for accepting radio frequency input that connects to the processor 240 via an intermediary RS-232 connection. A radio transmitter and receiver are used by the radio connection 250c to transmit and receive the radio frequency signals. One of ordinary skill in the art will appreciate that any suitable radio connection 250c scheme may be used. For example, the radio connection 250c may connect directly to the processor 240 and use any suitable physical and data link scheme to format the digital signals.

The three alternative link interfaces described above are merely examples, and additional means for implementing the link interface between the data network telephone 208a and the PID 210a may also be used. Although three link interfaces are shown in FIG. 3, there may be only one such interface in the data network telephone 208a. More than one link interface may be included to improve flexibility and to provide redundancy in case of failure of one of the link interfaces.

The user interface circuitry 260 includes hardware and software components that access the functions of the handset, display, and keypad to provide user input and output resources for functions in the processor 240. The user interface circuitry includes a display interface 262, a keypad interface 264, an audio output interface 265, and an audio input interface 267.

The audio input interface 267 may receive voice signals from a microphone or other audio input device and convert the signals to digital voice information. The conversion preferably conforms to the G.711 ITU Standard. Further processing of the digital signal may be performed in the audio input interface 267, such as providing compression (e.g. using G.723.1 standard) or providing noise reduction, although such processing may also be performed in the processor 240. Alternatively, the audio input interface 267 may communicate an analog voice signal to the processor 240 for conversion to digital information within the processor 240.

The audio output interface 265 receives digital information representing voice from the processor 240 and converts the information to audible sound, such as through the one or more speakers 107a,b in FIG. 1. In one embodiment, the audio output interface 265 receives information in the form of G.711, although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention. In addition, some of the features described here, such as the display interface 262, are optional and serve to enhance the functionality of the first data network telephone 208a.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software to implement the functions of the data network telephone 208a. The operating system may be any suitable commercially available embedded or disk-based operating system, or any proprietary operating system.

The processor 240 includes a media engine 241 and a signaling stack 243 to perform the primary communications and application functions of the data network telephone 208a. The purpose of the signaling stack in the exemplary data network telephone 208a is to set up, manage, and tear down a call. During the setup phase, a user may use the keypad to enter a user identifier to call. Alternatively, a PID such as PID 210a may transmit the user identifier of the party across the first link 209a. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice-over-data channel is established. During the management phase, for example, other parties may be invited to the call if needed. During the tear down phase, the call is terminated.

The signaling protocol used in the data network telephone 208a in FIG. 3 is the SIP protocol. In particular, the signaling stack implements a User Agent Client 244 and a User Agent Server 242, in accordance with the SIP protocol. Alternative signaling protocols, such as the ITU-T H.323 protocol, MGCP, MEGACO, and others, may also be used to implement the present invention.

Once the call is set up, the media engine 241 manages the communication over one or more data communications channels using network transport protocols and the network interface 270. The media engine 241 sends and receives data packets having a data payload for carrying data and an indication of the type of data is being transported. The media engine 241 in the data network telephones 208a may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter. Similar procedures may be performed for other types of data, such as graphical data, or for data used in PID applications such as email, contacts data, calendar data, other non-voice sound data, interactive game data, etc.

The media engine 241 may also include hardware and software components for performing registration functions 247, voice-over-data functions 249, display data functions 251, and keypad output functions 253. The media engine 241 processes data that is received from the network 212, and data to be sent over the network 241.

For data that is received from the network 212, the media engine 241 may determine from the type of data in the packet (such as by examining a packet header) whether packets contain sampled voice signals or other data types. Packets containing sampled voice signals are processed by the voice-over-data function 249. The voice-over-data function 249 preferably conforms to a protocol for formatting voice signals as digital data streams. While any suitable protocol may be used, the media (i.e. the voice signal) is preferably transported via the Real Time Protocol (RTP), which itself is carried inside of UDP (User Datagram Protocol). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 208a with a network telephony service are processed by the registration function 247. By registering the data network telephone 208a, a user may establish with the network telephony connection server 150 that calls addressed to the user's user identifier may be connected to the data network telephone 208a. Registration may occur when the data network telephone 208a sends a request to register to a service provider host, such as the network telephony connection server 150. The service provider host may respond by setting the user's user identifier to correspond to the telephone identifier of the data network telephone 208a, and by acknowledging the request with a status message to the data network telephone 208a. In one embodiment, a request to register the data network telephone 208a to a default user is automatically sent during power-up of the data network telephone 208a.

Other features may be added to the registration functions 247, or implemented as extensions to the registration functions 247. For example, the first data network telephone 208a may be provisioned to provide selected network telephony services by establishing a data connection with a service provider, requesting the selected services, and receiving data that ensures that the services have been successfully provisioned. Such services may include, for example, caller identification, call forwarding, voice mail and any other services offered by the network telephony service provider to enhance the capabilities of the first data network telephone 208a. One advantage of provisioning functions is that services may be ordered for temporary use in a manner convenient to the user.

Packets containing data for display on a display device of the data network telephone 208a are processed by the display data function 251. The display data function 251 may be used for displaying, for example, the names and user identifiers of other parties to the call, the status of the telephone call, billing information, and other information.

For data to be sent over the data network 212, the media engine 241 formats the data as data packets in accordance with a selected protocol. The selected protocol is preferably a protocol that is supported by data network telephones that will receive the data being transported. The media engine 241 may include a data connection application 245 to perform functions relating to data connections over the data network 206. The data network telephone 208 may include a data connection management protocol (e.g. the hypertext transport protocol, or http) to handle data connections. Alternatively, the SIP protocol may be used to establish data connections as well as voice connections. The data connection application 245 may also perform proxy services to permit the PID 108 to establish data connections.

In one embodiment, a radio application 257 is included to permit the data network telephone 208a to function as a radio receiver. Radio programmers that broadcast radio programs as radio airwaves may also broadcast or communicate the radio programs as radio-over-data, or audio signals carried by data signals on the data network 106 (in FIG. 1) instead of by a carrier signal over the airwaves. The audio signals are converted to digital signals and communicated in accordance with a selected communications protocol, such as the RTP protocol. The radio application 257 "tunes" to a radio program on the data network 106 by establishing a data connection with the server used by the radio programmer to communicate the radio-over-data signal. The radio application 257 employs the appropriate data communications protocols to extract the audio signal from the data connection.

The radio application 257 may include a user interface that provides the user with volume and tuning functions that the user may access via the display 262. One advantage of using a radio-over-data signal is that radio programming from all over the world is accessible. The radio application 257 may include a list of available radio programming, or permit connection to a service that provides access to the available programming. Function keys, or display icons may be programmed as radio presets that connect to user selectable radio programs. In one embodiment, the radio application 257 communicates with the PID 108 via one of the alternative links for volume, tuning and other user interface functions.

The voice-over-data function 249 formats voice samples according to the protocol used by the receiving data network telephone for processing voice-over data signals. In one preferred embodiment, the voice over data function 249 formats voice samples as RTP packets. The registration function 247 and the keypad output function 253 may control the transport of data that does not represent voice signals.

The data network telephones 208b and 218a are preferably similar or identical to the data network telephone 208a. For each of the data network telephones 208a–b and 218a, many of the features described in FIG. 3 are optional and their inclusion depends on the services to be offered.

5. The Portable Information Devices (PIDs)

Figure 4:
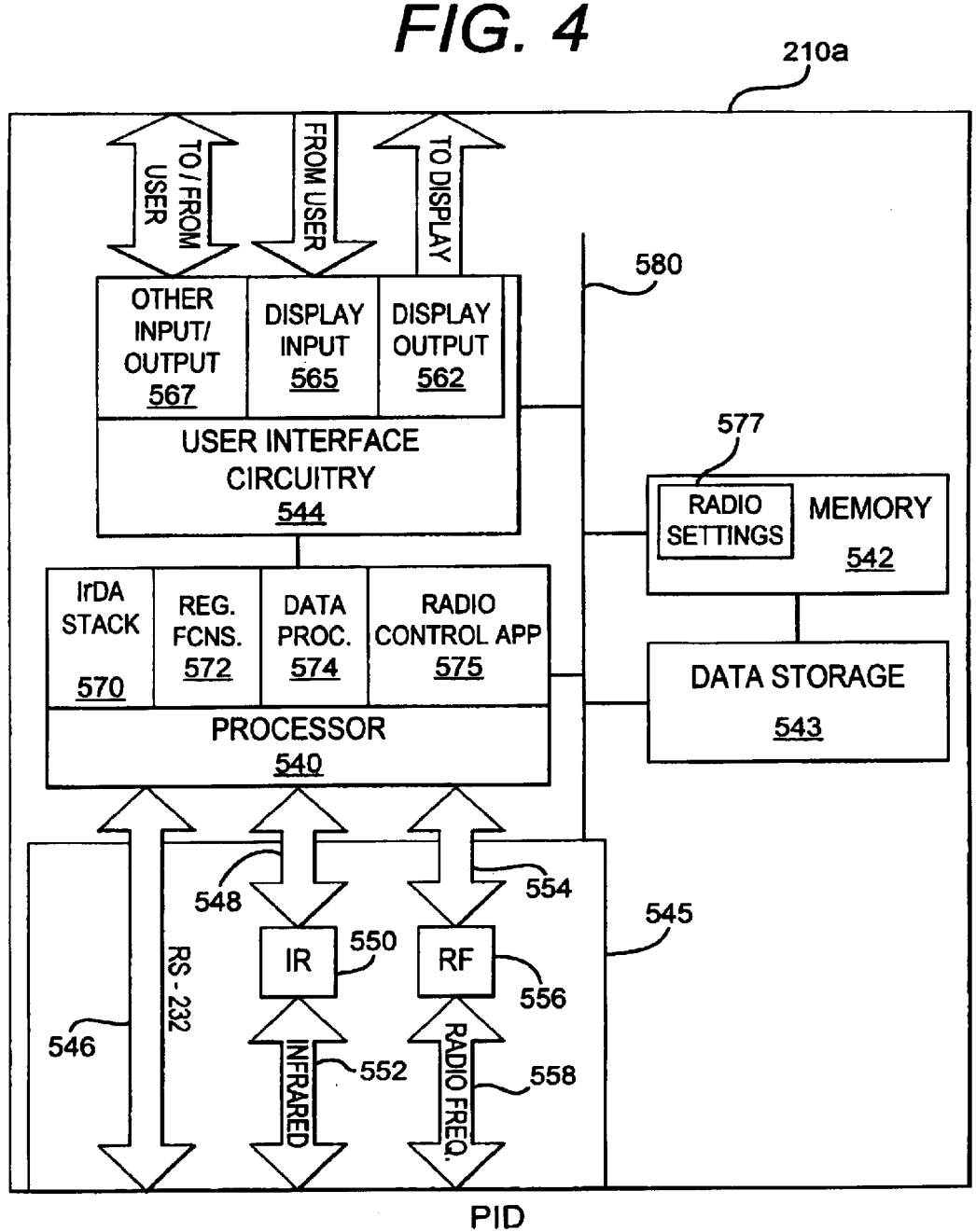
FIG. 4 is a block diagram of a PID according to an exemplary embodiment of the present invention.

FIG. 4 is a block diagram showing the exemplary PID 210a that can communicate via the link 209a with the data network telephone 208a connected to the LAN 212. The PID 210a may be linked to the data network telephone 208a through a link interface 545. A bus 580 may be used to connect the point-to-point interface 545 with a processor 540, a memory 542, data storage 543, and user interface circuitry 544.

The link interface 545 shown in FIG. 4 illustrates three alternative link interfaces for establishing a link to a data network telephone, such as the data network telephone 208a.

A first link interface 546 includes an RS-232 serial connection and associated coupling hardware circuitry. The first alternative link interface 546 may, for example, be for coupling with a PDA docking cradle, in which information can be transferred between the PDA and the data network telephone 208a. The second alternative link interface comprises a first connection 548, such as an RS-232 serial connection, along with infrared circuitry 250 for converting signals into infrared output and for accepting infrared input. An infrared interface 552 may also be included within the second alternative link interface. The third alternative link interface comprises a first connection 554, such as an RS-232 connection, along with radio-frequency circuitry 556 for converting signals into radio frequency output and for accepting radio frequency input. A radio frequency interface 558 may also be included as part of the third alternative interface. The radio interface 554/556/558 may be implemented according to the Bluetooth specifications, described at www.bluetooth.com.

The three alternative link interfaces described above are merely exemplary, and additional means for implementing the interface between the PID 210a and the data network telephone 208a may also be utilized. Although three link interfaces are shown in FIG. 4, there may be only one such interface in the PID 210a. More than one link interface may be included to improve flexibility and to provide redundancy in case of failure of one of the link interfaces.

The user interface circuitry 544 includes hardware and software components that provide user input and output resources for functions in the processor 540. The user interface circuitry includes a display output 562, a display input 565, and an additional input/output interface 567.

The display output 562 preferably receives digital information representing graphical data from the processor 540 and converts the information to a graphical display, such as text and/or images, for display on a display screen, for example.

The display input 565 may receive data inputs, such as graphical data inputs, from a user of the PID 210a. The graphical data inputs are preferably entered by the user with a stylus on a pressure-sensitive display screen, and may include text, drawings, or other objects that are capable of being graphically presented.

The additional input/output interface 567 allows the user to enter other types of data besides graphical data into the PID 210a. For example, audio data, additional graphical data, or additional input, such as video camera input for example, may be entered through the additional input/output interface 567. The data may also include data formatted for operation with particular applications on the PID. For example, email data, calendar data, contacts data, database data, spreadsheets, notes, game data, etc. may also be entered. Touch-sensitive screen buttons are an exemplary method for a user to enter control data into the PID 210a.

The processor 540 may include an operating system, as well as application and communication software, to implement the functions of the PID 210a. The operating system may be any suitable commercially available operating system, or any proprietary operating system. The operating system and software may be stored on data storage 543, in the memory 542, or the may be embedded in the processor 540. Although the processor 540 is shown connected to the data storage 543 through a bus 580, other configurations may also be used. Similarly, the memory 542 may be configured other than as shown in FIG. 4, and may be embedded within the processor 540.

The PID 210a is able to send data to and receive data from the data network telephone 208a across a point-to-point link, such as the point-to-point link 209a shown in FIG. 1. A user enters PID data at the display input 565. The graphical data may be processed in the user interface circuitry 544 or it may go directly to the processor 540 or the memory 542. The processor 540 may also perform processing functions, such as compression.

A PID data application may be used to perform functions that may implement the display input, the display output, and the processing functions. For example, a radio control application 575 may be used to control radio programming reception by the data network telephone 208 (shown in FIG. 3) in a format suitable for the PID 210. The radio control application 575 may include a user interface that displays selectable volume and tuning options as familiar icons. The user may manipulate the volume and tuning functions using the graphical user interface via the user interface circuitry 544. The user's selections may then be communicated to the radio application 257 on the data network telephone 208 using one of the point-to-point interfaces 545, allowing the selections to be received by the data network telephone 208.

The radio application 257 on the data network telephone 208 receives the selections across the point-to-point link. A volume setting selection may be implemented directly by manipulating the audio output 265 on the data network telephone 208. A tuning selection is prepared for transmission across the data network 206, such as by the media engine 241 shown in FIG. 3. Preferably the request is converted to data packets and is communicated on a data channel across the LAN 212 through the router 228 across the data network 206 to the selected radio program site. The radio application 257 on the data network telephone 208 may then receive the radio-over-data signal from the radio programmer and communicate the audio signal on the audio output 265. The radio application may also communicate the identification of the radio station selected to the PID 210.

The radio application 257 may provide feedback for display on the PID display 109 (shown in FIG. 1). For example, the volume setting may be displayed as an analog bar graph and the selected radio program may be displayed by its geographical location and radio station identifier. The memory 542 on the PID 210 may include storage locations for radio settings 577 that may be accessed by the radio control application 575 for future use by the user. For example, the radio settings 577 may include station presets that may also be displayed on the PID display 109 to permit the setting of a radio program by a user selection of the preset.

The link 209a between PID 210a and the first data network telephone 208a can alternatively be implemented as an infrared link using all or parts of a specialized protocol, such as the Infrared Data Association (IrDA) protocol stack, where data is interpreted through the stack between application-layer processes at each end of the link.

Figure 5:
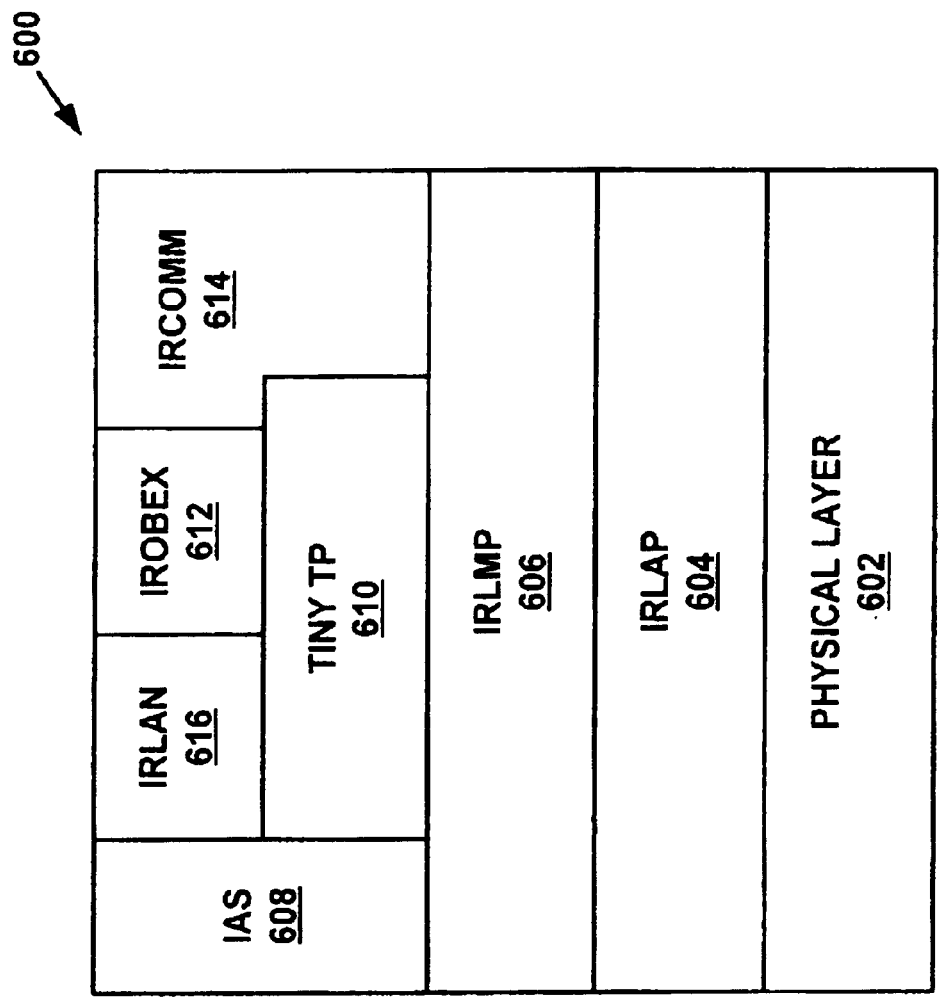
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. For example, the first PID 210a and the first data network telephone 208a could each implement an IrDA protocol stack to enable the link 209a. As a second alternative, two PIDs, such as the first PID 210a and the third PID 218a, may each contain an IrDA stack. In the second alternative, the communications between the PIDs and the data network telephones might take place without the assistance of IrDA. For example, IrDa data from the first PID 210a might be transmitted across the link 209a as a serial stream of data to the first data network telephone 208a, which might treat the IrDA data like any other data received from the first PID 210a. The first data network telephone 208a may then assemble the IrDA data into packets, such as TCP/IP packets for transport across the access and data networks to the third data network telephone 218a. The third data network telephone 218a may disassemble the packets and forward the IrDA data (without interpreting the IrDA portions) across the link 219a to the third PID 220a. The third PID 220a could then process the IrDA information received across the networks.

The required layers of an IrDA protocol stack are the physical layer 602, the IrLAP layer 604, the IRLMP layer 606 and the IAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http://www.irda.org/standards/specifications.asp and is incorporated by reference herein.

The IrDA protocol stack can be implemented at just the PID devices at the endpoints with the intermediate phones and networks simply providing a tunnel for the media stream attendant to the infrared links. Since PIDs, such as the Palm PDA, already have an IrDA stack implemented in them to support their infrared link to other devices and the benefits of the IrDA stack are already available. By using the layers of the IrDA protocol stack, the PID applications and the base applications in the phones can be simplified as the IrDA protocol layers take over certain functionalities. For example, the IrOBEX layer in each IrDA protocol stack can be used to transfer text and graphics object files, such as electronic business cards or whiteboard graphics, end-to-end between PID devices connected via data connected data network telephones.

With the IrDA stack being implemented only in the PIDs and not in the phones, only a small level of delay is introduced for stack interpretation by each PID and the connection provided is largely transparent to the applications in the PID devices, i.e. little or no modification to existing user applications in the PIDs is required. This approach may be more suitable for delay sensitive applications, such as interactive games involving the transfer of data between user applications in each PID.

It should be noted that the IrDA stack is written for a single infrared point-to-point interface and not for an infrared-to-network-to-infrared interface. As a result, the timers and retransmission schemes implemented in view of the single infrared point-to-point interface may not function properly for the extended network interface.

Alternatively, IrDA stacks can be implemented in the phones as well. By implementing IrDA stacks in the phones, the timing of the infrared interface is unaffected by a network delay. Also, additional functions and features can be implemented in the phones. For example, the phones can implement challenge and authentication where the phone requires the user, through the PID, to enter a password or other information to authenticate an authorized user. Similarly, the PID may also be used to transmit commands to the phone and receive status information via the IRDA stack. The approach taken will depend upon the requirements of the design and the particular application.

6. Providing Telephony and Access to Internet Services

FIG. 6 is a functional block diagram and protocol stack diagram illustrating an embodiment of the protocol stacks in the first PID 210*a* and the first data network telephone 208*a* that support link 209. FIG. 6 depicts the operation of the protocol stacks during the initiation of access to the radio server 105 from the Internet content provider 101 (see FIG. 2). The protocol stacks in the data network telephone 208*a* connect with the protocol stacks in the Internet content provider 101 as described below to establish communication with the radio programming provided by the radio server 105. The protocol stacks in the data network telephone 208*a* also communicate with the protocol stacks in the PID 210*a* as described below to permit control of the radio functions such as tuning and volume control by the PID 210*a*.

In the infrared RS-232 embodiment, the link interface circuitry 545 (shown in FIG. 4) in the first PID 210*a* provides the physical layer 600, such as that specified by the Infrared Data Association (IrDA), that connects via link 209*a* to the link interface circuitry 250*b* (see FIG. 3) implementing a physical layer 604 in the first data network telephone 208*a*. The data link layer 602 in the first PID 210*a* provides data link control for link 209*a* in transferring data to and from the radio control application 575. Similarly, the first data network telephone 208*a* includes a data link layer 606 and the radio application 257 that is configured to synchronize connection and other functions with the radio control application 575 in the first PID 210*a*.

The PID 210*a* may include a radio "On" function to initiate the radio application 257 in the data network telephone 208*a*. The radio "On" function may be activated by a user-selectable icon that transmits a command or request to initiate the radio application 257 to the data network telephone 208*a*, or by the user initiating the radio control application 575. The radio "On" function is sent across the link 209*a* to the first data network telephone 208*a* by the radio control application 575 in the PID 210*a*, where it is either received by the radio application 257 or used to initiate execution of the radio application 257. Alternatively, the data network telephone 208*a* may include a radio "On" function to invoke start up of the radio application 257 without using the PID 210*a*.

When the radio application 257 receives the radio "On" function, a request for radio servers 105 is sent to the Internet content provider 101. The request for radio servers 105 may be sent by the radio application 257 on a connection to the Internet content provider 101 as a request for data, such as a hotlink, or an URL. The URL uses the HTTP (Hyper-Text Transport Protocol) 666, the TCP protocol 610 and IP protocol 608 to transport the request over a radio request data channel 611. The request may be a request to connect to the radio server 105, which may include a web-site, or a data service that accesses radio programs via the Internet. The request to connect may include a request for information regarding the radio programming offered by the radio servers 105 on the Internet content provider 101. The request to connect, or URL, may be sent across the Internet 206 to the Internet content provider 101 (see FIG. 2) using the radio request data channel 611.

The URL is received by the Internet content provider 101 and processed by the IP protocol 622, the TCP protocol 624, and the HTTP protocol 616. The HTTP protocol 616 performs the connection to the radio servers 105 and establishes a radio-over-data channel 613 back to the data network telephone 208*a* using the RTSP protocol 620 (or the RTP protocol) and the UDP protocol 618. The radio-over-data channel 613 is used to communicate data from the Internet content provider 101 to the data network telephone 208*a*, which in the present embodiment includes radio-over-data programming signals. The radio-over-data channel 613 and the connection 209*a* are also used to communicate radio programming selects, or lists of stations that provide radio programming to which the user may listen.

Once the connection (at 209*a*, 611, 613) between the PID 210*a* and the radio servers 105 is established, the user may select a station to listen to by entering a tuning request (No. 2) at the user interface 544 of the PID 210a. A tuning request may be entered in a variety of ways. A set of station presets may be configured on the display 109 (see FIG. 1) in which graphical buttons may be set to send selected URLs to the Internet content provider 101. The tuning request may also be entered by selecting from a menu or list of available radio programs, in which each entry of available radio programs corresponds with the URL or hotlink used to connect to it.

The tuning request is formatted as a message containing the URL to the selected radio station and sent over connection 209*a* to the data network telephone 208*a*. The message is received. The URL may be re-formatted as an URL for transmission to the Internet content provider 101 using the radio request data channel 611. The radio server 105 at the Internet service provider 101 receives the URL to the selected station and uses HTTP 616, TCP 628 and IP 626 to connect to the selected station from among the radio programmers. When the connection is made, the radio server 105, or alternatively, another service at the Internet content provider 101 communicates radio programming received from selected station to the data network telephone 208*a* using the radio-over-data channel 613.

One of ordinary skill in the art will appreciate that an alternative process for selected radio programming without using the PID 210*a*. Any menu or display user interface used with the PID 210*a* may also be used with the data network telephone 208*a*.

The signals received from the Internet content provider 101 are processed using the UDP 612 and RTSP 614 (or RTP) at the data network telephone 257. The audio signals in the radio-over-data signal on the radio-over-data channel 613 that are received at the data network telephone 2 are extracted from the radio application 257*a* and output at speakers connected to the audio output 26.

Figure 7A:
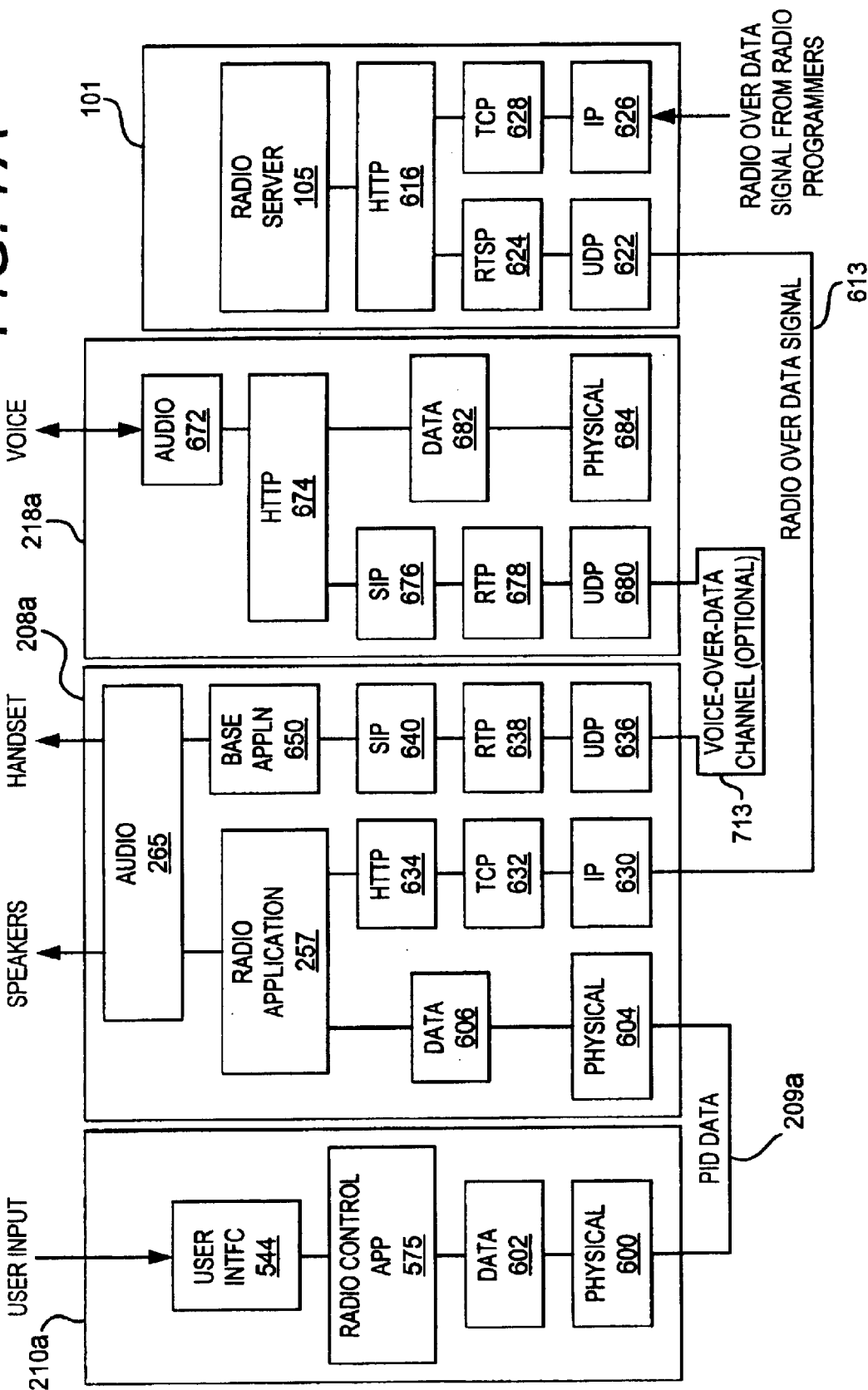
FIG. 7A is block and stack layer diagram illustrating an embodiment of the present invention in which a connection to an Internet service may be established.

One advantage of the system described with reference to FIG. 6 is that the user may select a radio station to play on the data network telephone 208a while simultaneously holding a telephone conversation with another individual. FIG. 7A is a functional block and protocol stack diagram illustrating an embodiment of the present invention where a SIP connection is established from the first data network phone 208a to the third data network phone 218a through network connection 230, first access network 212, data network 206, second access network 214 and network connection 236. The routers 228 and 238, and associated connections 232a–b and 234a–b, are not shown to simplify the block diagram representation. The diagram of FIG. 7A shows how requests for Internet services, such as radio servers, can be transmitted and responses to the requests processed simultaneously with a telephone connection in one aspect of the present invention.

The radio control application 575 in the PID 210a is configured to send PID data as input, which in the present context is a request for data, such as a hotlink, or an URL. The request is sent through the user interface 544 through link 209a to the radio application 257 in the first data network telephone 208a. In this embodiment, the radio application 257 is configured to define data channels for transport to the Internet content provider 101. The Internet content provider 101 responds to the request by sending back requested services to the PID 110a. For example, the Internet services may send back radio-over-data from radio servers 105 to the PID 110a as PID data.

Multiple data channels in SIP may be defined through the Session Description Protocol described in RFC 2327, herein incorporated by reference. Included in a SIP INVITE request for a connection is options for the requested connection that describe the number and type of media streams. Each media stream is described by a "m=" line in the INVITE request. For example, a request for a connection that includes an audio stream and a bidirectional video stream using H.261 might look like this:

TABLE 1 v = 0
o = alice 2890844526 2890844526 IN IP4 host.anywhere.com
c = IN IP4 host.anywhere.com
m = audio 49170 RTP/AVP 0
a = rtpmap:0 PCMU/8000
m = video 51372 RTP/AVP 31
a = rtpmap:31 H261/90000

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 7A, a first data channel for voice data 713 has been negotiated by the base applications 660 in the first data network telephone 208a and the base application 674 in the second data network telephone 218a. In addition, a second data channel for Internet services data, which in FIG. 7A is the radio-over-data channel 613, has been negotiated by the radio application 257 in the first data network telephone 208a and radio server 105 in the Internet content provider 101. The base applications 660 and 674 transfer voice data between the AUDIO applications, such as applications including G.711 encoders, in each phone via the first data channel.

One advantage of the embodiment in FIG. 7A is that the voice channel is optional. The users may request the radio-over-data connection 613 to the radio server 105 while conversing on the phones 208. Alternatively, a user may connect to the radio server 105 independent of any voice connection.

Another advantage of the embodiment of FIG. 7A is that the radio services may be accessed at any time during the telephone connection. For example, a user may be involved in a telephone conversation using the voice channel shown in FIG. 7A when at some point, the user may be put on-hold. Rather than listen to programming from the other party's phone system, the user may select radio programming over the radio-over-data connection 613 shown in FIG. 7A.

FIG. 7B shows an alternative embodiment for providing a data connection from the PID 110a to the Internet content provider 101 and for providing control over the radio application 257 in the data network telephone 208a. The link 209a in FIG. 7B is an RS232 connection. The PID 110a includes an IP stack that includes a Point-To-Point client 653. In addition, the telephone 208a includes a PPP server 663. The PID 110a may connect directly to the Internet services 101 with its own IP address. One advantage of using the PPP-based connection in FIG. 7B is that even a basic, low-cost PID 110a may perform sophisticated Internet communications because the PPP is widely available at a low cost.

C. Accessing Internet Services Concurrent with Voice Services

FIG. 8 shows an exemplary embodiment of the present invention for transmitting data from an Internet service concurrently with voice services during a telephone conversation. The PID 210a includes a display screen 702 and a stylus 700 that a user can use to select a hotlink, or URL address to a Web service. For example, the stylus 700 may be used to select a radio "On" button 705 to initiate the radio control application 575 (shown in FIG. 4) and the radio application 257 (shown in FIG. 3) on the data network telephone 208a. The radio application 257 may then send an URL to the Internet content provider 101 to connect to the radio servers 105. Alternatively, a SYNC button 718 may be used to initiate a series of requests to the Internet content provider 101.

The display screen 702 is shown as a pressure-sensitive display screen in which the stylus 700 can be used to enter PID data into the first PID 210a. In the example shown in FIG. 8, the PID 210a includes the radio control application 575, which displays the radio display 702. The display 702 includes a series of presets 704, a tune button pair 707, a volume button pair 709a, a volume indicator 709b and a radio station indicator 711. Radio stations are identified as hotlinks, or URL's, that address their locations on the Internet. The station presets 704 are each configured by the user to correspond to a hotlink to a selected station and stored in the PID memory 542. For example, the preset 704 labelled "2" is assigned a hotlink 706 in the PID memory 542. When the user presses Preset 2 with the stylus 700, the hotlink 706 corresponding to preset 2 is retrieved from memory 542 and communicated on a PID data channel 714.

The PID channel 714 is the data channel formed on connection 209a (see FIGS. 6-7B) to communicate between the PID 210a and the data network telephone 208a. The connection 209a is preferably an infrared connection. When the first data network telephone 208a receives the transmitted hotlink 706, the radio application 257 (see FIG. 3) in the first data network telephone 208a will place the hotlink 706 in the PID data channel 714 into PID data packets for transmission to the Internet content provider 101 across the access and data networks 212, 206 (and any associated connections and routers). The transmission is made on a TCP/IP channel 724 communicated over the connection 611 (see FIGS. 6-7B).

The Internet content provider 101 then processes the hotlink 706 and responds by connecting to the requested radio server 105, which connects to a radio station 731 which is addressed by the hotlink 706. The radio station connects to the radio server 105 at the Internet content provider 101 using a UDP/RTP radio-over-data channel 717. The radio server 105 then sends the radio-over-data signals in the radio-over-data channel 729 back to the data network telephone 208*a*. The data network telephone 208 extracts the audio signals from the radio-over-data signals and outputs the audio signals on the speakers 107*a,b*. The data network telephone 208*a* may then send a message to the PID 210*a* on the PID channel 209*a* to acknowledge that the selected radio station is playing. The PID 210*a* may then display the identity of the radio station on the display 702.

While the invention has been described in conjunction with presently preferred embodiments of the invention, persons of skill in the art will appreciate that variations may be made without departure from the scope and spirit of the invention. For example, the access networks shown in FIG. 2 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for accessing radio programming in a data network telephony system comprising:
    a data network to provide data connectivity for a plurality of data communications channels using data transport protocols;
    a radio server connected to the data network, the radio server operable to communicate an audio signal as radio-over-data packets on a radio-over-data channel, the radio-over-data channel being one of the plurality of data communications channels;
    a data network telephone connected to the data network, the data network telephone operable to communicate a voice signal as voice-over-data packets on a voice-over-data channel, the voice over data channel being one of the plurality of data communications channels, the data network telephone operable to convert voice-over-data packets communicated on the voice-over-data channel to voice signals, the data network telephone operable to communicate with the radio server via the radio-over-data channel, the data network telephone further comprising an audio output;
    a radio application in the data network telephone operable to receive the audio signals in the radio-over-data channel and to couple the audio signals to the audio output;
    a portable information device comprising a graphical user interface and a data network telephone interface, the graphical user interface operable to accept and display information from the Internet service, the data network telephone interface operable to communicate at least one request for data network services with the data network telephone; and
    a radio control application executing in the portable information device, the radio control application operable to communicate a radio station selection via the data network telephone interface, the radio station selection being one of the requests for data network services having a data network identifier corresponding to a selected radio station, wherein the data network telephone communicates the radio station selection to the radio server to use the radio station selection to access the selected radio station; wherein:
    the data network telephone includes a portable information device interface to communicate with the data network telephone interface on the portable information device; and
    the data network telephone interface comprises:
    a link interface circuit having a transmitter and receiver to communicate PID data between the portable information device and the data network telephone;
    a data link controller to process the PID data in accordance with a communications specification; and
    the link interface circuit includes an infrared transmitter and receiver to communicate the PID data; and wherein:
    the communications specification includes a specification selected from the group comprising: the Infrared Data Association and the Point-To-Point Protocol.

2. The system of claim 1 wherein the link interface circuit includes a radio frequency transmitter and receiver to communicate the PID data.

3. The system of claim 2 wherein the communications specification includes the Bluetooth specification.

4. A data network telephone comprising:
    a user interface circuit having a keypad, a graphical user interface display, an audio input and an audio output;
    a data network interface operable to connect the data network telephone to a data network to provide data connectivity on at least one data communications channel;
    the data network interface operable to communicate audio signals as audio-over-data packets using a radio-over-data channel connected to a radio server, the radio server being operable to access the audio signals from a radio station that communicates radio programming over the data network, the radio-over-data channel being one of the data communications channels;
    a signaling stack to initiate a telephone connection on a voice-over-data channel using the data network interface to communicate voice signals as voice-over-data packets, the voice-over-data channel being one of the data communications channels;
    a voice-over-data application operable to process a voice signal in the voice-over-data packets received over the voice-over-data channel and to couple the voice signal to the audio output, the voice-over-data application operable to convert an input voice signal received from the audio input to voice-over-data packets to communicate on the voice-over-data-channel;
    a radio application operable to process the audio signal in the audio-over-data packets and to couple the audio signals to the audio output;
    a radio control application operable to communicate a radio station selection on a radio request channel via the data network interface to the radio server, the radio station selection having a data network identifier corresponding to a selected radio station, wherein the radio server uses the radio station selection to access the selected radio station; and a portable information device interface to communicate with a portable information device comprising a graphical user interface and a data network telephone interface, the graphical user interface operable to accept and display information from the Internet service, the data network telephone interface operable to communicate at least one request for data network services with the data network telephone;

wherein the portable information device interface comprises:

a link interface circuit having a transmitter and receiver to communicate PID data between the portable information device and the data network telephone; a data link controller to process the PID data in accordance with a communications specification;

the link interface circuit includes an infrared transmitter and receiver to communicate the PID data; and wherein:

the communications specification includes a specification selected from the group comprising: the Infrared Data Association and the Point-To-Point Protocol.

5. The data network telephone of claim 4 wherein the link interface circuit includes a radio frequency transmitter and receiver to communicate the PID data.

6. The data network telephone of claim 5 wherein the communications specification includes the Bluetooth specification.

* * * * *